Feb. 3, 1959 — H. R. PEARCE — 2,871,595
CALENDAR WITH A CURRENT DATE INDICATOR
Filed Oct. 7, 1957 — 3 Sheets-Sheet 1
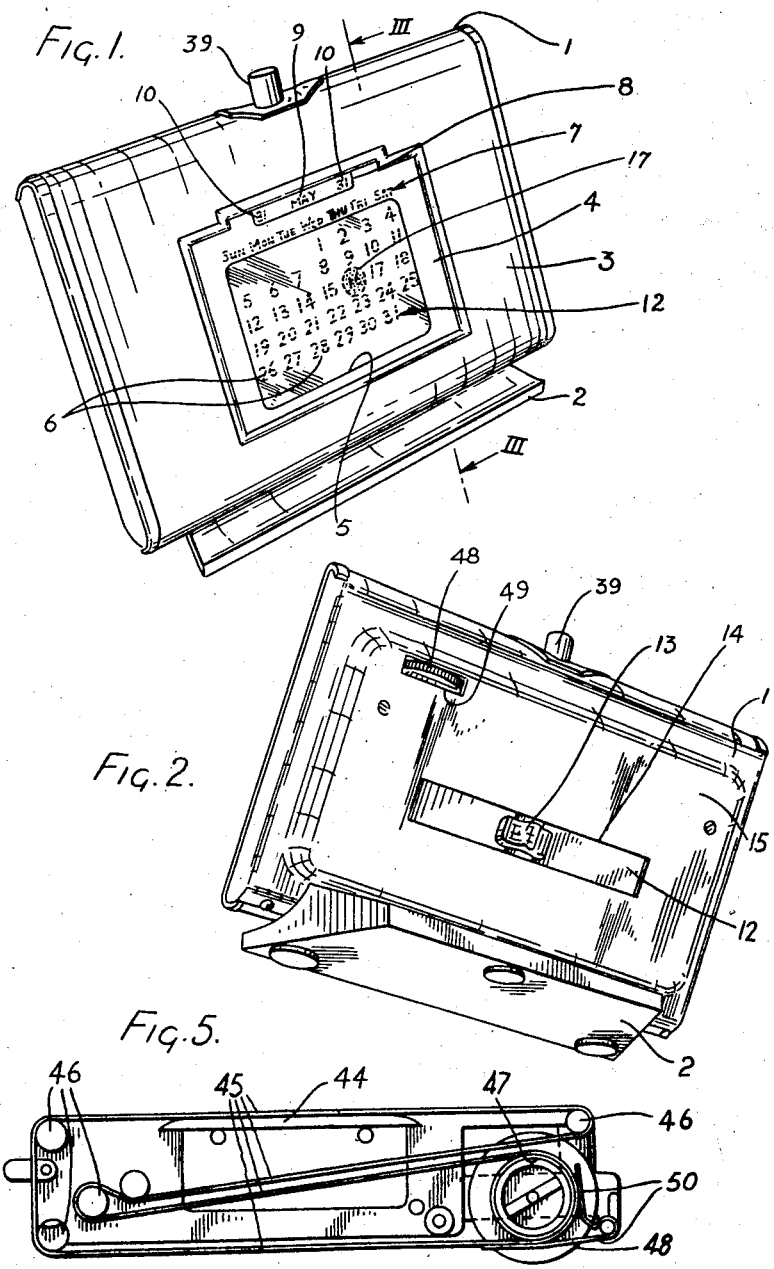

Feb. 3, 1959 — H. R. PEARCE — 2,871,595
CALENDAR WITH A CURRENT DATE INDICATOR
Filed Oct. 7, 1957 — 3 Sheets-Sheet 2

Inventor
Howard Reginald Pearce.
By A. Knight Croad
Attorney

Feb. 3, 1959 H. R. PEARCE 2,871,595
CALENDAR WITH A CURRENT DATE INDICATOR
Filed Oct. 7, 1957 3 Sheets-Sheet 3
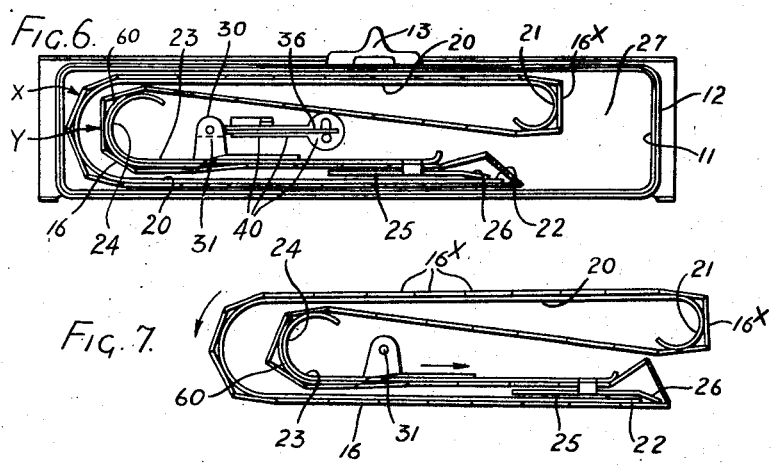
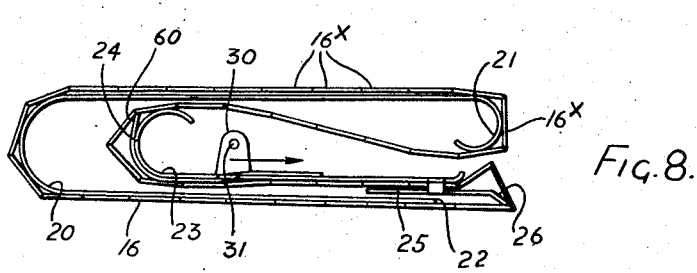
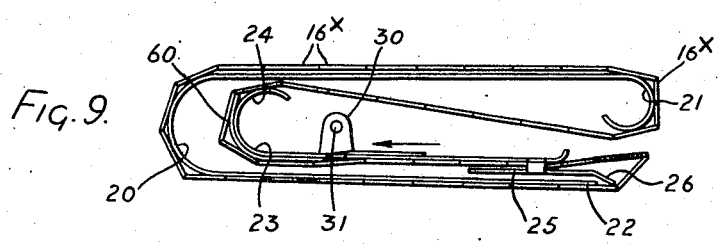
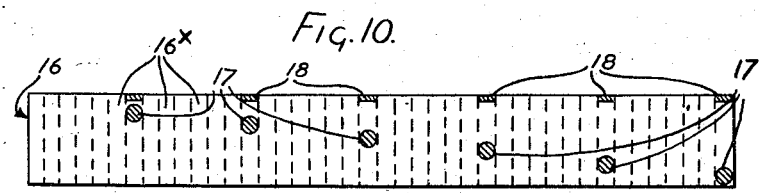
Inventor
Howard Reginald Pearce.
By
Attorney United States Patent Office 2,871,595
Patented Feb. 3, 1959

2,871,595

CALENDAR WITH A CURRENT DATE INDICATOR

Howard Reginald Pearce, London, England

Application October 7, 1957, Serial No. 688,775

Claims priority, application Great Britain October 12, 1956

3 Claims. (Cl. 40—110)

This invention relates to calendars, in particular perpetual calendars having means for indicating the particular day and/or date in a month, and it has for its object to obviate the necessity of returning said means to a starting position at the beginning of each month, and to this end according to this invention there is provided a perpetual calendar having an endless band adapted to be moved step-by-step with respect to a sheet or the like bearing date numbers, said band having thereon means for indicating one date number at a time, the step-by-step movement of the band being adapted to move said means into indicating relationship with the date numbers in succession.

Preferably the sheet bearing the date numbers is transparent and the endless band is disposed behind it and has arranged thereon one or more squares, circles or the like which serve to frame or outline and thereby indicate the date numbers individually.

The date numbers would normally be arranged in rows one above the other, the numbers in each row below the first being greater by seven than the numbers immediately above them. The sheet as a whole would be adjustable so that at the beginning of each month the date number "1" may be set to indicate the appropriate day of the week, the days of the week being given in a line on a separate card or on a fixed front frame for the calendar. Each row of numbers serves to indicate the dates for one week, all the rows below the first being extended to the left to allow for the case where the first day of the month falls on the last day of the week. Only seven numbers in each row would of course be visible at a time. It is a preferred feature of this invention that the endless band should also include means for indicating the particular day of the week on which each date of a month falls. The squares, circles or the like printed on the endless band are arranged in echelon whereby each will move over one row of date numbers.

According to the main preferred feature of this invention the endless band is divided transversely into a plurality of equal band sections each articulated to the sections on either side thereof, the step-by-step movement of the endless band corresponding to the width of each section (that is the width lengthwise of the endless band as a whole). The endless band is supported on two members so that normally it lies in two taut loops one within the other, one of the members being fixed, and the other member being reciprocable with respect to said fixed member and having means for engaging, on being moved in one direction, in the acute angle formed by two band sections where the outer and inner loops join whereby the band as a whole is drawn around the fixed member.

The principle of the construction and operation of a calendar in accordance with this invention will be clear from the accompanying drawings and following description thereof.

In the accompanying drawings:

Figure 1 shows a calendar in accordance with this invention from the front,

Figure 2 shows the same calendar from behind,

Figure 4:
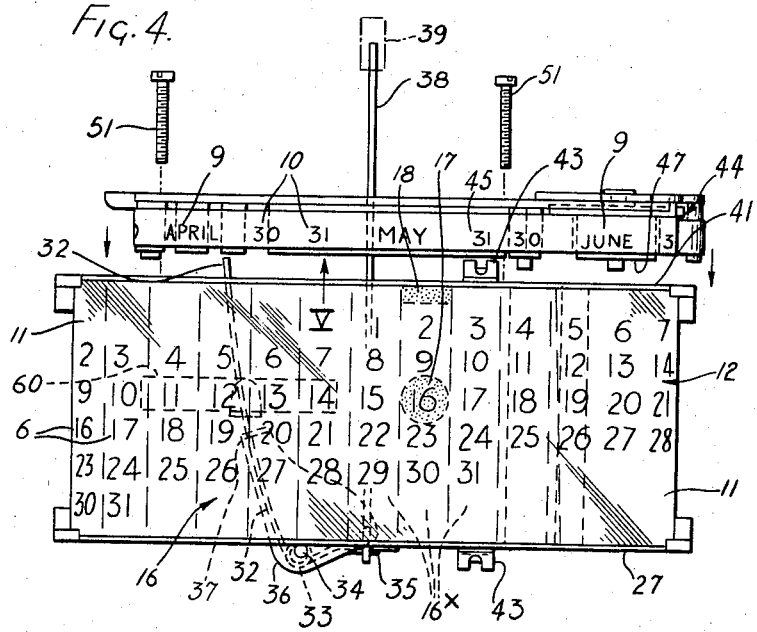
Figure 3:
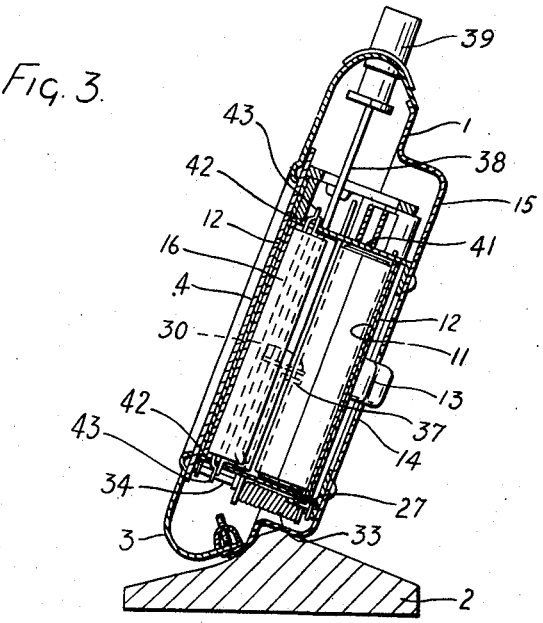
Figure 3 is a section on the line III—III of Figure 1.

Figure 4 is a front elevation, drawn on an enlarged scale, of the operative parts of the calendar shown in Figures 1 to 3, these parts being shown partially separated, Figure 5 is an underneath plan view of the member for supporting the month name band, that is in the direction of the arrow V in Figure 4, Figures 6 to 9 are plan views illustrating the movement of the operative parts of the calendar, and Figure 10 shows the articulated endless date indicator band of the calendar, drawn on a reduced scale, when opened out flat.

The calendar shown in the accompanying drawings comprises an elongated upright shallow box-like casing 1 mounted on a suitable pedestal 2 and having an apertured front panel 3. Behind the aperture in the front panel there is provided a protective sheet 4 of transparent material which is stencilled on the back to form a window 5 through which the date numbers 6 for one month will be visible. The stencilling also includes, immediately above the window 5, abbreviations 7 for the days of the week, and above these again a further smaller window 8 through which month names 9, together with indications 10 of the number of days in each month, will be visible.

Within the casing 1, spaced from the inside of the wall thereof, there is provided a fixed three-sided upright frame 11 which is open at the front, that is behind the aperture in the front panel 3. An endless transparent sheet 12, bearing date numbers 6 arranged as hereinbefore described, is mounted on this frame and is movable around it in either direction by means of a slide 13 secured to the back portion of the sheet 12 and extending through an elongated horizontal slot 14 in the back panel 15 of the casing.

Inside the frame 11 there is supported an endless opaque band 16 which is movable across the window 5 in the protective sheet 4 behind the transparent band 12 from left to right, that is when looking at the front of the calendar as in Figure 1. The band 16 is divided transversely into a plurality of equal upright band sections 16x, each articulated to the sections on either side thereof. The band may, for example, be made of stout paper which has been scored or weakened transversely to provide the necessary band sections. Arranged on the band sections 16x in echelon is a plurality of coloured (for example yellow) circles, squares or the like 17 (see Figure 10) which as the band 16 is moved with respect to the transparent sheet 12 frame in succession the numbers printed on the latter. In addition a coloured rectangle 18 is printed on the band 16 above each circle 17 thereon, each rectangle being arranged so that it is moved along behind the day abbreviations 7 on the protective sheet 4. Thus while a circle 17 frames and so indicates the date of the month, the rectangle 18 blocks in and so indicates the day of the week.

The endless band 16 is supported in part on and passes around a fixed upright sheet-like member 20 of substantially the same width as the band, this member being, when seen in plan (Figures 6 to 9), in the form of an elongated flattened U which is open to one side of the frame 11 supporting the transparent sheet 12. One limb of this U-shaped member 20 extends across the back of the frame 11 sufficiently closely thereto to hold the endless band 16 against it, but at the same time allowing it to be moved as required. At its free end this limb is curved round forwardly into a loop 21, the diameter of which is approximately the same as the width of a section 16x of the endless band 16. The other limb of the U-shaped member 20 extends across the window 5 in the protective sheet 4 fairly closely thereto. It terminates in a forwardly inclined end piece 22 which lightly presses the endless band 16 against the inside of the frame 11.

The portion of the endless band 16 passing around the above described U-shaped member 20 forms an outer loop therein (see X in Figure 6), inside which an inner loop is formed (see Y in Figure 6) by taking the band through the open end of the U and passing it around a second sheet like member 23 disposed inside the member 20. This second member 23 is, at the end thereof adjacent the closed end of the outer member 20, curved rearwardly into a loop 24 around which the endless band 16 will move easily, but otherwise it is flat and extends across the frame 11 parallel and fairly close to the front limb of the member 20. Near the end opposite to the loop 24 the member 23 is secured on its front side to a plate 25 disposed parallel thereto in spaced relationship, the endless band 16 being arranged to pass between this plate and the member 23. The plate 25 extends beyond the end of the member 23, the edge of the plate being bent forwardly at 26 towards the rear surface of the front limb of the member 20.

The lower end of the frame 11 is closed by a plate 27 which fits into the casing 1 and is supported therein above the bottom thereof, the frame 11 and the member 20 actually having tongue and slot connections with the plate 27 whereby they are firmly located in position. The member 23 is slidable endwise with respect to the member 20 as is explained hereinafter.

A rearwardly extending lug 30 is secured to the rear face of the member 23 approximately mid-way between the top and bottom edges thereof, this lug having therein an aperture 31 through which passes an elongated end piece 32 of a coil spring 33 which is mounted on a pin 34 supported on the under side of the plate 27, the other end of the spring 33 being located by a tongue 35 pressed out of the plate 27. Rockably mounted on the pin 34 is a substantially triangular plate 36 (see Figure 4), the pin passing through one corner of the plate and the latter having at its upper end or corner an apertured lug 37 through which passes the end piece 32 of the spring 33. The third corner of the plate 36 is connected to the cranked lower end of an upwardly extending push rod 38 to the upper end of which is secured a push button 39 which is slidably supported in the top of the casing 1. The plate 27 is apertured as at 40 for the passage therethrough of the plate 36 and the push rod 38.

The action of the spring 33 is always to urge the end piece 32 thereof, and therefore the member 23, towards the closed end of the U-shaped member 20. If, however, the push button 39 is depressed, the push rod 38 pushes on the triangular plate 39 and rocks it about the pin 34. This in turn causes the end piece 32 to rock away from the closed end of the U-shaped member 20, thus causing the member 23 to slide towards the open end of the member 20. As soon as the press button 39 is released, the spring 32 causes the member 23 to return to its initial position. The movements of the member 23 are indicated by arrows in Figures 7, 8, and 9.

The upper end of the frame 11 is also closed by a plate 41 which is apertured for the passage therethrough of the push rod 38 and also to allow free movement of the upper end of the end piece 32 of the spring 33. Moreover the plates 27 and 41 are provided with opposed elongated slots 42 through which pass upwardly and downwardly directed lugs 43 on the plate 25, whereby the movements of the member 23 will be positively guided.

Mounted on the top of the plate 41 is a unitary member 44 (see Figure 5) for supporting an endless band 45 on which the month names 9, together with the indications 10 of the number of days in each month are marked. The band 45 is passed around pins 46 and a friction wheel 47 which is rotatable by means of a knurled wheel 48 which projects through an aperture 49 in the back of the casing 1. The band 45 is lightly pressed against the wheel 47 by a spring 50 so that as the wheel is rotated the band will be drawn around it and the pins 46. The member 44 is secured to the plate 41 by screws 51.

The use and operation of the calendar described above will now be explained.

First of all the endless band 45 is adjusted by means of the knurled wheel 48 to bring the correct month name into the window 8. Secondly the endless sheet 12 is adjusted by means of the slide 13 to bring the first date of the month under the appropriate day of the week above the window 5. It will be assumed that the actual date is the 16th day of May, and it will be seen that in the drawings the date number for the 16th is framed by a coloured circle 17. At the same time the rectangle 18 blocks in the appropriate day of the week, in this case Thursday.

As explained hereinbefore, with the member 23 in its normal rest position it is disposed near to the closed end of the U-shaped member 20. In this position (see Figure 6) the two loops X and Y in the endless band 16 are substantially taut. The edge piece 26 of the plate 25 bears on the endless band 16 at a point approximately mid-way between the vertical edges of one section 16x of the band. After this section the next section of the band turns back at an acute angle into the inner loop Y.

To change the date of the calendar, in other words to move the circle 17 to the date number for the 17th and the rectangle 18 to Friday, the push button 39 is depressed. As explained above, this causes the member 23 to slide towards the open end of the U-shaped member 20. When this happens the edge piece 26 engages in the acute angle (as referred to in the preceding paragraph) between the two sections 16x of the band (see Figure 7). At the same time movement of the loop 24 of the member 23 allows the inner loop Y to become slack so that the band 16 as a whole can be moved around with respect to the member 20. The movement of the member 23 is sufficient to carry the circle 17 from one date number to the next and the rectangle 18 from one day to the next (see Figure 8). When the member 23 returns to its rest position, under the action of the spring 33, it takes up the slack in the inner loop Y and as the edge piece 26 slides back over the end section 16x in the front of the outer loop X and reaches the next section said end section is hinged rearwardly (see Figure 9) until the two sections are disposed at an acute angle to each other ready for the next operation by the push button. A leaf spring 60 may be provided on the front of the member 23 to ensure that the slack in the band 16 is taken up.

In a modified construction the sheet 12 bearing the date numbers is made opaque except for the actual figures. The coloured circles 17 would then move behind the figures in succession so that one coloured figure would be clearly visible at a time, the colours of the sheet 12 and the endless band 16 being chosen so as to blend whereby all but the one figure would remain invisible or substantially so.

I claim:

1. A calendar with a current date indicator comprising a casing, a sheet bearing date numbers mounted in said casing, an endless band adapted to be moved with respect to said sheet across the face thereof, said band having means thereon for indicating one date number at a time and being divided transversely into a plurality of equal band sections each articulated to the sections on either side thereof, means adapted to support said endless band within the casing in two loops one within the other, said supporting means comprising two members adapted at rest to hold the band with its two loops taut, one of said members being fixed and the other of said members being reciprocable with respect to said fixed member, drive means associated with said supporting means within the casing for effecting movement of said endless band step-by-step in one direction with respect to the supporting means to bring said indicating means into register with the date numbers in succession, said reciprocable member having means for engaging, on being moved in one direction by said drive means, in the acute angle formed by two band sections of the endless band where the outer and inner loops thereof join whereby the band as a whole is drawn one step around the fixed member, and control means including an element accessible from the exterior of the casing for operating said drive means.

2. A calendar as claimed in claim 1 having spring means for holding the reciprocable member in a rest position to maintain the loops in the endless band taut, and push button control means for causing movement of said member in the one direction against the restoring force of said spring means.

3. A calendar with a current date indicator comprising a casing, a sheet bearing date numbers mounted in said casing, an endless band adapted to be moved with respect to said sheet across the face thereof, said band being divided transversely of its direction of movement into a plurality of equal band sections each articulated to the sections on either side thereof, which band sections have arranged thereon in echelon means for indicating one date number at a time, means for supporting said endless band in the casing so that the band can be moved continuously in one direction across the face of said sheet, said supporting means comprising two members adapted at rest to hold the band in two taut loops one within the other, one of said members being fixed, and the othere of said members being mounted for endwise reciprocating movement with respect to said fixed member, an edge piece on said reciprocable member adapted to engage, on the movement of this member in one direction, in the acute angle formed by two band sections where the outer and inner loops join whereby the band as a while is drawn one step around the fixed member, spring means for holding the reciprocable member in its rest position to maintain the loops in the endless band taut and for returning it to this position after movement in said one direction, a rocking member mounted in said casing for causing movement of said reciprocable member in the one direction against the restoring force of said spring means, a push rod for actuating said rocking member and a push button mounted on the push rod and accessible from the exterior of the casing.

References Cited in the file of this patent

UNITED STATES PATENTS

| | | |
|---|---|---|
| 1,415,686 | Oppenheim | May 9, 1922 |
| 1,432,504 | Vivian | Oct. 17, 1922 |

FOREIGN PATENTS

| | | |
|---|---|---|
| 113,921 | Great Britain | Mar. 14, 1918 |
| 370,272 | Germany | Mar. 1, 1923 |
| 453,161 | Great Britain | Sept. 7, 1936 |
| 486,936 | Italy | Nov. 19, 1953 |
| 848,106 | Germany | Sept. 1, 1952 |